US009743438B2

(12) United States Patent
Kishiyama (10) Patent No.: US 9,743,438 B2
(45) Date of Patent: Aug. 22, 2017

(54) RADIO COMMUNICATION METHOD, RADIO COMMUNICATION SYSTEM, AND MOBILE STATION (75) Inventor: Yoshihisa Kishiyama, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 14/116,042

(22) PCT Filed: Jun. 26, 2012

(86) PCT No.: PCT/JP2012/066241
§ 371 (c)(1),
(2), (4) Date: Nov. 6, 2013

(87) PCT Pub. No.: WO2013/002206
PCT Pub. Date: Jan. 3, 2013

(65) Prior Publication Data
US 2014/0120934 A1 May 1, 2014

(30) Foreign Application Priority Data

Jun. 27, 2011 (JP) ................................. 2011-141925
Nov. 15, 2011 (JP) ................................. 2011-249899

(51) Int. Cl.
H04W 72/00 (2009.01)
H04W 76/02 (2009.01)
(Continued)

(52) U.S. Cl.
CPC ....... H04W 76/023 (2013.01); H04W 56/001 (2013.01); H04W 56/002 (2013.01); H04W 72/02 (2013.01); H04W 8/005 (2013.01)

(58) Field of Classification Search
None
See application file for complete search history.

(56) References Cited

U.S. PATENT DOCUMENTS

2004/0048609 A1* 3/2004 Kosaka ...................... 455/422.1
2004/0116110 A1* 6/2004 Amerga ................ H04W 48/16
455/422.1

(Continued)

FOREIGN PATENT DOCUMENTS

JP 2009-017560 A 1/2009
JP 2011-040832 A 2/2011
(Continued)

OTHER PUBLICATIONS

International Search Report for corresponding International Application No. PCT/JP2012/066241, mailed Jul. 31, 2012 (3 pages).
(Continued)

Primary Examiner — Moustapha Diaby
(74) Attorney, Agent, or Firm — Osha Liang LLP (57) ABSTRACT Provided are a radio communication method, a radio communication system, and a mobile station, by which it is possible to easily establish initial access between mobile stations in D2D communication. A mobile station 200A transmits a synchronization-use signal to be used for establishment of initial access with a mobile station 200B toward the mobile station 200B on the basis of control information received from a cell to which the mobile station 200A is connected. The mobile station 200B receives the synchronization-use signal on the basis of the control information received from the cell. Moreover, the mobile station 200B determines transmission power and a transmission timing of a response signal on the basis of the received synchronization-use signal, and transmits the response signal toward the mobile station 200A. The mobile station 200A and the mobile station 200B start D2D communication on the basis of the synchronization-use signal and the response signal.

15 Claims, 8 Drawing Sheets (51) Int. Cl.
*H04W 56/00* (2009.01)
*H04W 72/02* (2009.01)
*H04W 8/00* (2009.01)

(56) References Cited

U.S. PATENT DOCUMENTS

| | | | |
|---|---|---|---|
| 2004/0157631 A1* | 8/2004 | Stobart | 455/502 |
| 2004/0171402 A1* | 9/2004 | Tamaki et al. | 455/522 |
| 2006/0005029 A1* | 1/2006 | Petrovic | G06F 21/10 713/176 |
| 2006/0258383 A1* | 11/2006 | Jiang et al. | 455/502 |
| 2007/0183392 A1* | 8/2007 | Tandai et al. | 370/350 |
| 2008/0043744 A1* | 2/2008 | Keller | H04W 72/005 370/395.2 |
| 2009/0011770 A1 | 1/2009 | Jung et al. | |
| 2009/0046683 A1* | 2/2009 | Jung | H04W 56/002 370/338 |
| 2009/0325625 A1* | 12/2009 | Hugl | H04W 52/16 455/522 |
| 2010/0165882 A1 | 7/2010 | Palanki et al. | |
| 2010/0279672 A1* | 11/2010 | Koskela et al. | 455/418 |
| 2010/0313241 A1* | 12/2010 | Lee | G06F 15/16 726/3 |
| 2011/0182280 A1* | 7/2011 | Charbit | H04W 56/0045 370/350 |
| 2011/0223953 A1* | 9/2011 | Lee et al. | 455/509 |
| 2011/0268004 A1* | 11/2011 | Doppler et al. | 370/311 |
| 2012/0044815 A1* | 2/2012 | Geirhofer et al. | 370/248 |
| 2012/0127949 A1 | 5/2012 | Yoshimoto et al. | |
| 2012/0258706 A1* | 10/2012 | Yu | H04W 56/0045 455/426.1 |
| 2012/0269165 A1* | 10/2012 | Chin | H04W 36/0077 370/331 |
| 2012/0269178 A1* | 10/2012 | Li | H04W 76/02 370/336 |
| 2012/0281679 A1* | 11/2012 | Fan | H04W 74/008 370/336 |
| 2012/0290650 A1* | 11/2012 | Montuno et al. | 709/204 |

FOREIGN PATENT DOCUMENTS

| | | | | |
|---|---|---|---|---|
| JP | 2012-514435 A | 6/2012 | | |
| WO | 2010/035100 A1 | 4/2010 | | |
| WO | WO 2010035100 A1 * | 4/2010 | | H04W 56/00 |
| WO | 2010/108549 A1 | 9/2010 | | |
| WO | WO 2010108549 A1 * | 9/2010 | | H04W 56/00 |
| WO | WO 2011109941 A1 * | 9/2011 | | |

OTHER PUBLICATIONS

Written Opinion for corresponding International Application No. PCT/JP2012/066241, mailed Jul. 31, 2012 (3 pages).
K. Doppler et al.; "Device-to-Device communications; functional prospects for LTE-Advanced networks;" Communications Workshops, 2009. ICC Workshops 2009. IEEE International Conference on, IEEE, Jun. 18, 2009, pp. 1-6 (7 pages).
3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)" Mar. 2011 (197 pages).
Office Action issued in corresponding Japanese Application No. 2011-249899, mailed Dec. 16, 2015 (16 pages).
Office Action issued in corresponding Japanese Application No. 2011-249899, mailed Sep. 1, 2015 (13 pages).
Extended Search Report issued in corresponding European Application No. 12804404.7, mailed Oct. 19, 2015 (9 pages).
Office Action issued in corresponding Japanese Application No. 2011-249899, mailed May 10, 2016 (9 pages).

* cited by examiner

RADIO COMMUNICATION METHOD, RADIO COMMUNICATION SYSTEM, AND MOBILE STATION

TECHNICAL FIELD

The present invention relates to a radio communication method, a radio communication system, and a mobile station, by which initial access is established between radio terminals.

BACKGROUND ART

Long Term Evolution (LTE), which is standardized in 3rd Generation Partnership Project (3GPP), defines the use of a predetermined synchronization signal sequence as a method in which a mobile station and a base station establish initial access (see, for example, Non Patent Literature 1).

Specifically, the base station periodically transmits a Synchronization Signal (SS), and the mobile station detects the SS transmitted by the base station and receives broadcast information. Moreover, the mobile station transmits a Physical Random Access Channel (PRACH) as a synchronization signal sequence for the base station. At this time point, the reception timing of the mobile station is established.

The base station receives the PRACH and exchanges a message (a shared data channel) with the mobile station, thereby establishing a connection with the mobile station. At this time point, the transmission timing of the mobile station is established and initial access is established.

CITATION LIST

Non Patent Literature

[NPL 1] 3GPP TS 36.300 V10.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), March 2011

SUMMARY OF INVENTION

Meanwhile, in so-called Device-to-Device (D2D) communication in which a mobile station directly performs radio communication with another mobile station without passing through a base station, there is a problem that it is not possible to apply the aforementioned establishment method of the initial access in the mobile station and the base station as is. That is, in the D2D communication, there is a problem that it is difficult to establish initial access between a mobile station (a first mobile station) requesting a connection and a mobile station (a second mobile station) serving as a connection destination.

Therefore, the present invention has been achieved in view of the above-described situations, and an object thereof is to provide a radio communication method, a radio communication system, and a mobile station, by which it is possible to easily establish initial access between mobile stations in D2D communication.

A first characteristic of the present invention is summarized in that a radio communication method, which uses a first mobile station that transmits and receives a radio signal and a second mobile station that performs direct communication for transmitting and receiving a radio signal to and from the first mobile station without passing through a base station, comprising: a step of transmitting, by the first mobile station, a synchronization-use signal to be used for establishment of initial access with the second mobile station toward the second mobile station on the basis of control information received from a cell to which the first mobile station is connected; a step of receiving, by the second mobile station, the synchronization-use signal on the basis of the control information received from the cell; a step of determining, by the second mobile station, transmission power and a transmission timing of a response signal on the basis of the received synchronization-use signal, and transmitting the response signal toward the first mobile station; and a step of starting, by the first mobile station and the second mobile station, communication on the basis of the synchronization-use signal and the response signal.

A second characteristic of the present invention is summarized in that a radio communication system (a radio communication system 10), comprising: a first mobile station (a mobile station 200A) that transmits and receives a radio signal and a second mobile station (mobile station 200B) that performs direct communication for transmitting and receiving a radio signal to and from the first mobile station without passing through a base station (a base station 100), wherein the first mobile station comprises: a first control information reception unit (synchronization sequence reception unit 230) that receives control information from a cell to which the first mobile station is connected; a synchronization-use-signal transmission unit (synchronization sequence transmission unit 220) that transmits a synchronization-use signal to be used for establishment of initial access with the second mobile station toward the second mobile station on the basis of the control information received by the first control information reception unit; and a first transmission/reception unit (data channel transmission unit 210 and data channel reception unit 240) that transmits and receives data to and from the second mobile station, and the second mobile station comprises: a second control information reception unit (synchronization sequence reception unit 230) that receives the control information from the cell; a synchronization-use signal reception unit (synchronization sequence reception unit 230) that receives the synchronization-use signal on the basis of the control information received by the second control information reception unit; a response signal transmission unit (synchronization sequence transmission unit 220) that determines transmission power and a transmission timing of a response signal on the basis of the synchronization-use signal received by the synchronization-use signal reception unit, and transmits the response signal toward the first mobile station; and a second transmission/reception unit (data channel transmission unit 210 and data channel reception unit 240) that transmits and receives data to and from the first mobile station.

A third characteristic of the present invention is summarized in that a mobile station (a mobile station 200B), which performs direct communication for transmitting and receiving a radio signal to and from another mobile station without passing through a base station, comprising: a first control information reception unit that receives control information from a cell to which the other mobile station is connected; a synchronization-use-signal transmission unit that transmits a synchronization-use signal to be used for establishment of initial access with the other mobile station toward the other mobile station on the basis of the control information received by the first control information reception unit; and a first transmission/reception unit that transmits and receives data to and from the other mobile station.

A fourth characteristic of the present invention is summarized in that a mobile station (a mobile station 200A), which performs direct communication for transmitting and receiving a radio signal to and from another mobile station without passing through a base station, comprising: a second control information reception unit that receives the control information from the cell; a synchronization-use signal reception unit that receives the synchronization-use signal on the basis of the control information received by the second control information reception unit; a response signal transmission unit that determines transmission power and a transmission timing of a response signal on the basis of the synchronization-use signal received by the synchronization-use signal reception unit, and transmits the response signal toward the first mobile station; and a second transmission/reception unit that transmits and receives data to and from the first mobile station.

DESCRIPTION OF EMBODIMENTS

Next, an embodiment of the present invention will be described. It is noted that in the following description of the drawings, the same or similar reference numerals are used to designate the same or similar portions. It will be appreciated that the drawings are schematically shown and the ratio of each dimension, for example, are different from the real ones.

Therefore, a specific dimension should be determined in view of the following description. Of course, among the drawings, the dimensional relationship and the ratio may be different.

Figure 1:
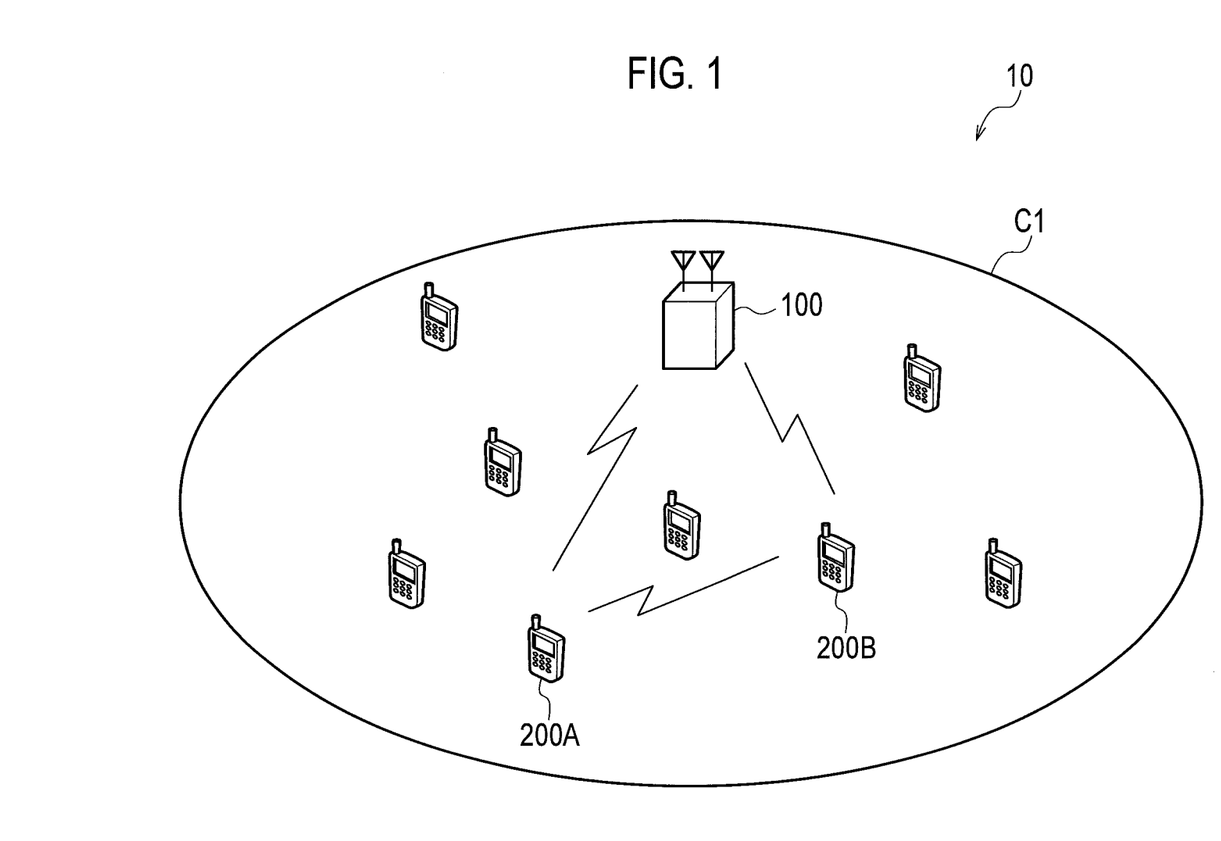
FIG. 1 is a diagram illustrating the entire schematic configuration of a radio communication system 10 according to an embodiment of the present invention.

First Embodiment (1) Entire Schematic Configuration of Radio Communication System FIG. 1 is a diagram illustrating the entire schematic configuration of a radio communication system 10 according to the present embodiment. As illustrated in FIG. 1, the radio communication system 10 includes a base station 100 and a plurality of mobile stations.

The base station 100 forms a cell C1 and performs radio communication with mobile stations which camp on the cell C1. Furthermore, the base station 100 transmits various types of control information toward the mobile stations camping on the cell C1.

In the present embodiment, the mobile station deals with Device-to-Device (D2D) communication (direct communication) in which the mobile station directly performs radio communication with another mobile station without passing through the base station 100. For example, a mobile station 200A camping on the cell C1 is able to directly transmit and receive a radio signal to and from a mobile station 200B camping on the same cell C1 without passing through the base station 100. In addition, the distance between the mobile station 200A and the mobile station 200B when the mobile station 200A and the mobile station 200B directly transmit and receive a radio signal is within about several hundreds of meters.

In the present embodiment, the mobile station 200A constitutes a first mobile station and the mobile station 200B constitutes a second mobile station.

(2) Functional Block Configuration of Radio Communication System 10

Figure 2:
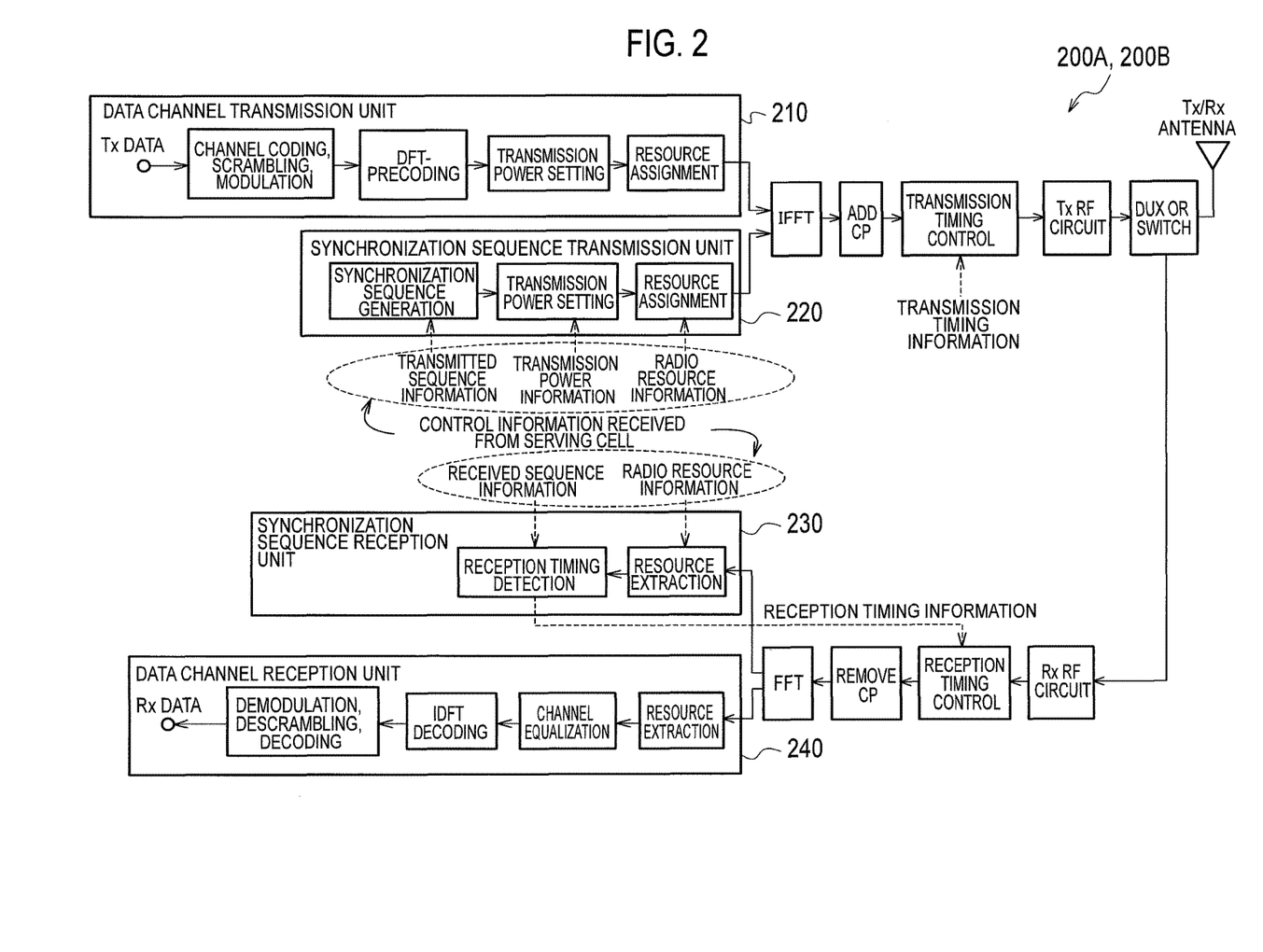
FIG. 2 is a functional block configuration diagram of mobile stations 200A and 200B according to the embodiment of the present invention.
Figure 3:
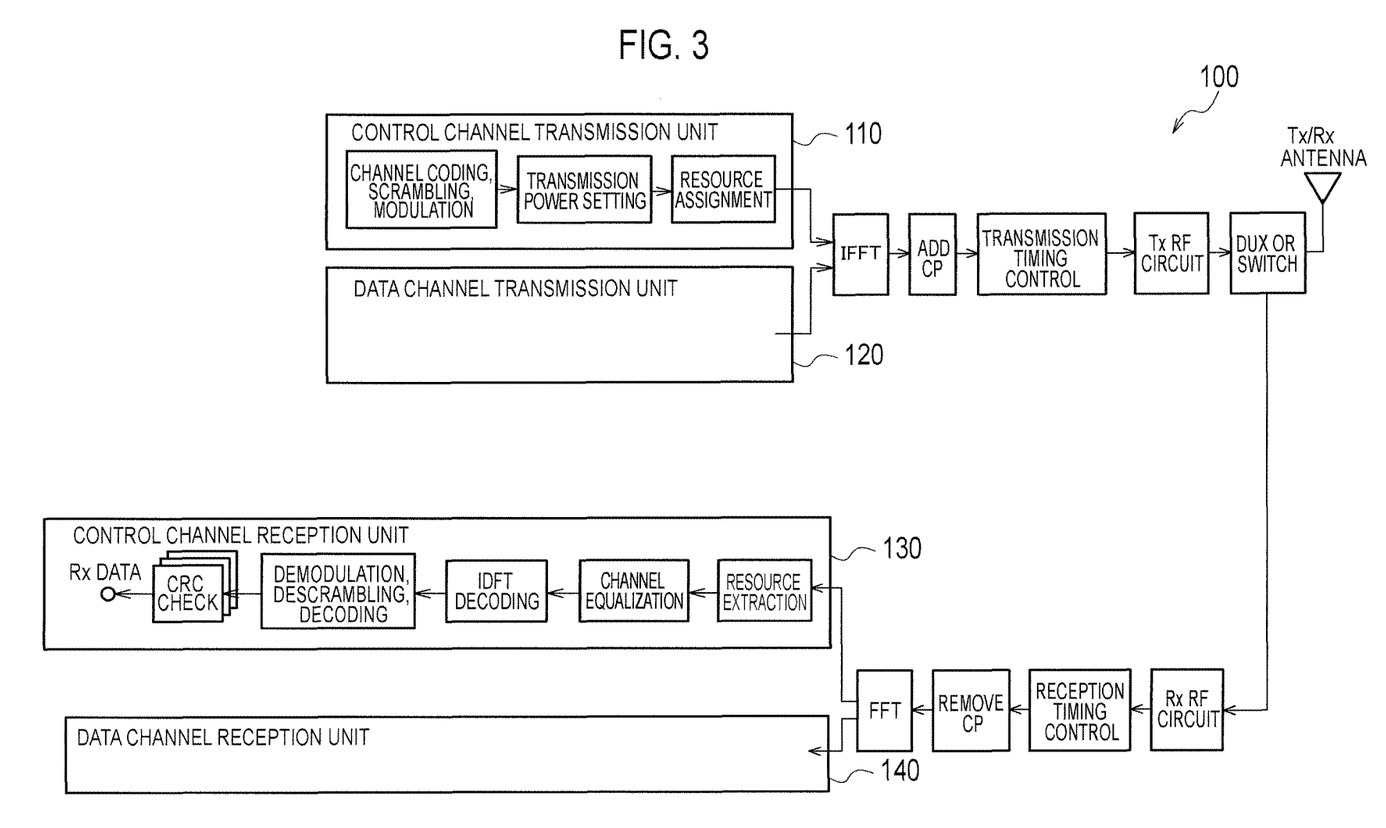
FIG. 3 is a functional block configuration diagram of a base station 100 according to the embodiment of the present invention.

Next, a functional block configuration of the radio communication system 10 will be described. FIG. 2 is a functional block configuration diagram of the mobile stations 200A and 200B. FIG. 3 is a functional block configuration diagram of the base station 100.

(2.1) Mobile Station 200A

As illustrated in FIG. 2, the mobile stations 200A and 200B have the same functional block configuration. Hereinafter, of the functional block configuration of the mobile station 200A constituting the first mobile station and the functional block configuration of the mobile station 200B constituting the second mobile station in the present embodiment, parts with high association with the present invention will be mainly described.

The mobile station 200A includes a data channel transmission unit 210, a synchronization sequence transmission unit 220, a synchronization sequence reception unit 230, and a data channel reception unit 240.

The data channel transmission unit 210 is configured by: a channel coding/scrambling/modulation function, a DFT-precoding function, a transmission power setting function, and a radio resource assignment function. The data channel transmission unit 210 performs coding, modulation and the like of transmission data, and outputs the processed transmission data as a data channel (for example, a shared data channel) signal.

Particularly, in the present embodiment, after the synchronization sequence transmission unit 220 transmits a synchronization sequence (a synchronization-use signal) toward the mobile station 200B and then a predetermined time (for example, several milliseconds or a plurality of TTIs) lapses, or when a response signal is received from the mobile station 200B, the data channel transmission unit 210 is able to transmit data toward the mobile station 200B.

Furthermore, the data channel transmission unit 210 is able to transmit a direct communication request for requesting D2D communication with a mobile station (specifically, the mobile station 200B), which is connected to the cell C1, toward the base station 100 forming the cell C1. In the present embodiment, the data channel transmission unit 210 constitutes a request transmission unit.

The synchronization sequence transmission unit 220 has a synchronization sequence generation function, a transmission power setting function, and a radio resource assignment function. Particularly, in the present embodiment, on the basis of control information received by the synchronization sequence reception unit 230, the synchronization sequence transmission unit 220 transmits a synchronization-use signal, which is to be used for the establishment of initial access with the mobile station 200B, toward the mobile station 200B.

In the present embodiment, the synchronization sequence transmission unit 220 constitutes a synchronization-use-signal transmission unit. Specifically, on the basis of control information received from the cell C1 to which the mobile station 200A is connected, that is, a serving cell, the synchronization sequence transmission unit 220 transmits a synchronization-use signal, which is a synchronization sequence to be used for the establishment of initial access (an initial connection) with the mobile station 200B, toward the mobile station 200B.

Figure 6:
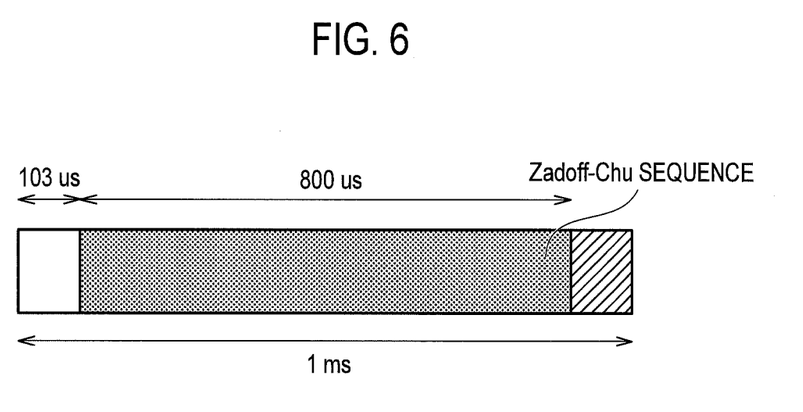
FIG. 6 is a diagram illustrating an example of a synchronization sequence that is used in the embodiment of the present invention.

Furthermore, FIG. 6 illustrates an example of a synchronization sequence that is used in the present embodiment. The synchronization sequence illustrated in FIG. 6 has a configuration obtained by reusing a Physical Random Access Channel (PRACH) sequence defined in the Long Term Evolution (LTE). As illustrated in FIG. 6, the synchronization sequence according to the present embodiment is formed by a Zadoff-Chu sequence (800 us). The Zadoff-Chu sequence is defined by the following Equation.

$$x_q(m) = \begin{cases} e^{-j\pi \cdot qm(m+1)/N} & N = \text{odd number} \\ e^{-j\pi \cdot qm^2/N} & N = \text{even number} \end{cases} \quad [\text{Math. 1}]$$

$N$: Sequence length of Zadoff-Chu sequence $q$: root sequence number

In addition, instead of the PRACH sequence, it is possible to use an existing reference signal sequence defined in the LTE, for example, a synchronization sequence having a configuration obtained by reusing a demodulation reference signal (DM-RS: De-Modulation Reference Signal) or a sounding reference signal (SRS: Sounding Reference Signal). These reference signal sequences are also formed by a Zadoff-Chu sequence.

The control information is configurable to include identification information of a synchronization-use signal and information of a radio resource that is used for the transmission of the synchronization-use signal. Specifically, the control information that is transmitted from the cell C1 may include control information indicating a signal sequence that is used in the mobile station 200B serving as a connection destination of the mobile station 200A. In addition, the signal sequence includes a radio resource (time/frequency) in a frequency domain or a time domain and a transmission power value. Furthermore, the signal sequence may include a transmission cycle of the radio resource. In addition, the identification information of a synchronization-use signal may include a sequence index of the synchronization-use signal or ID (D2D ID) capable of uniquely identifying the synchronization-use signal.

On the basis of the control information received by the synchronization sequence reception unit 230, the synchronization sequence transmission unit 220 transmits a synchronization-use signal, which follows a signal sequence that is used in the mobile station 200B, toward the mobile station 200B.

The synchronization sequence reception unit 230 receives a synchronization sequence from the cell C1 to which the mobile station 200A is connected. Specifically, the synchronization sequence reception unit 230 receives the aforementioned control information as the synchronization sequence. In the present embodiment, the synchronization sequence reception unit 230 constitutes a first control information reception unit. Moreover, on the basis of the direct communication request transmitted by the synchronization sequence transmission unit 220, the synchronization sequence reception unit 230 is able to receive the control information transmitted from the cell C1.

Furthermore, on the basis of the control information received from the cell C1, the synchronization sequence reception unit 230 receives a response signal. Specifically, the synchronization sequence reception unit 230 determines whether the response signal, which is a kind of the synchronization sequence received from the mobile station 200B, is directed to the mobile station 200A.

The data channel reception unit 240 is configured by: a radio resource extraction function, a channel equalization function, an IDFT decode function, and a demodulation/descrambling/decoding function. Specifically, in the present embodiment, D2D communication is started with the mobile station 200B, so that it is possible to directly receive data from the mobile station 200B. In the present embodiment, a first transmission/reception unit is constituted by the data channel transmission unit 210 and the data channel reception unit 240.

Specifically, the data channel reception unit 240 directly receives data transmitted from the mobile station 200B with employing a reception timing based on the response signal received from the mobile station 200B as a reference.

(2.2) Mobile Station 200B

As described above, the mobile station 200B has the same functional block configuration as that of the mobile station 200A. Hereinafter, a function of the mobile station 200B constituting the second mobile station will be mainly described.

On the basis of the control information received from the cell C1 to which the mobile station 200A and the mobile station 200B are connected, that is, the serving cell, the synchronization sequence transmission unit 220 transmits a response signal, which is a synchronization sequence to be used for the establishment of initial access with the mobile station 200A, toward the mobile station 200A. In the present embodiment, the synchronization sequence transmission unit 220 constitutes a response signal transmission unit.

Specifically, on the basis of a synchronization-use signal received by the synchronization sequence reception unit 230, the synchronization sequence transmission unit 220 determines transmission power and a transmission timing of the response signal. Moreover, the synchronization sequence transmission unit 220 transmits the response signal, the transmission power and the transmission timing of which are determined, toward the mobile station 200A. A format of the response signal, for example, may be the same as that of a normal physical uplink shared channel (PUSCH).

In addition, the synchronization sequence transmission unit 220 is able to transmit the response signal after the synchronization sequence reception unit 230 receives the synchronization-use signal and then a predetermined time (for example, several milliseconds or a plurality of TTIs) lapses.

On the basis of a measurement result of path loss of the synchronization-use signal by the synchronization sequence reception unit 230, the synchronization sequence transmission unit 220 is able to determine whether to transmit the response signal to the mobile station 200A. Specifically, on the basis of the measurement result of the path loss by the synchronization sequence reception unit 230, the synchronization sequence transmission unit 220 determines the transmission power of the response signal.

Furthermore, the synchronization sequence transmission unit 220 is able to transmit a response signal, which is scrambled using the identification information of the received synchronization-use signal, to the mobile station 200A. Specifically, the synchronization sequence transmission unit 220 performs scrambling on data (a response signal) to be transmitted, based on a sequence index (or D2D ID) of the synchronization-use signal. In addition, as a detailed method of the scrambling, a generally well-known method is available. In addition, the response signal may include a measurement value (or a power headroom) of the path loss of the synchronization-use signal for the purpose of transmission power control in the mobile station 200A. Moreover, the response signal may also include information on a payload size of the D2D communication and a radio resource assignment relation for the D2D communication.

The synchronization sequence reception unit 230 has a radio resource extraction function and a reception timing detection function. Specifically, in the present embodiment, the synchronization sequence reception unit 230 receives the control information from the cell C1. Furthermore, on the basis of the received control information, the synchronization sequence reception unit 230 receives the synchronization-use signal transmitted from the mobile station 200A. In the present embodiment, the synchronization sequence reception unit 230 constitutes a second control information reception unit and a synchronization-use signal reception unit.

Furthermore, the synchronization sequence reception unit 230 is able to measure path loss of the received synchronization-use signal. In the present embodiment, the synchronization sequence reception unit 230 constitutes a measurement unit. Specifically, on the basis of a transmission power value of the synchronization-use signal, which is included in the control information, the synchronization sequence reception unit 230 measures the path loss of the received synchronization-use signal. In addition, the synchronization sequence reception unit 230 may determine whether the received synchronization-use signal is directed to the mobile station 200B, and perform a process related to the reception of the synchronization-use signal.

The data channel transmission unit 210 and the data channel reception unit 240 transmit and receive data to and from the mobile station 200A. In the present embodiment, the data channel transmission unit 210 and the data channel reception unit 240 constitute a second transmission/reception unit. Furthermore, the data channel reception unit 240 is able to receive the control information transmitted from the cell C1, on the basis of the direct communication request transmitted from the mobile station 200A to the base station 100.

(2.3) Base Station 100

As illustrated in FIG. 3, the base station 100 includes a control channel transmission unit 110, a data channel transmission unit 120, a control channel reception unit 130, and a data channel reception unit 140. In addition, functions of the control channel transmission unit 110 and the data channel transmission unit 120 are approximately equal to each other, except that target channels are different from each other. In the same manner, functions of the control channel reception unit 130 and the data channel reception unit 140 are approximately equal to each other.

Specifically, in the present embodiment, the data channel transmission unit 120 and the data channel reception unit 140 detect a pair of mobile stations that are likely to perform D2D communication among mobile stations connected to the cell C1. In the present embodiment, the data channel transmission unit 120 and the data channel reception unit 140 constitute a mobile station detection unit. Specifically, the data channel transmission unit 120 and the data channel reception unit 140 detect a pair of mobile stations that perform communication via the base station 100 in the cell C1.

The control channel transmission unit 110 transmits control information toward mobile stations (for example, the mobile station 200A and the mobile station 200B, which are detected by the data channel transmission unit 120 and the data channel reception unit 140, and the mobile station 200B. Furthermore, on the basis of the direct communication request with the mobile station 200B, which is transmitted by the mobile station 200A, the control channel reception unit 130 is able to transmit the control information toward the mobile station 200A and the mobile station 200B.

(3) Operation of Radio Communication System 10

Next, with reference to FIG. 4 and FIG. 5, the operation of the radio communication system 10, specifically, an operation, in which the mobile station 200A and the mobile station 200B establish initial access, will be described.

(3.1) First Operation Example

Figure 4:
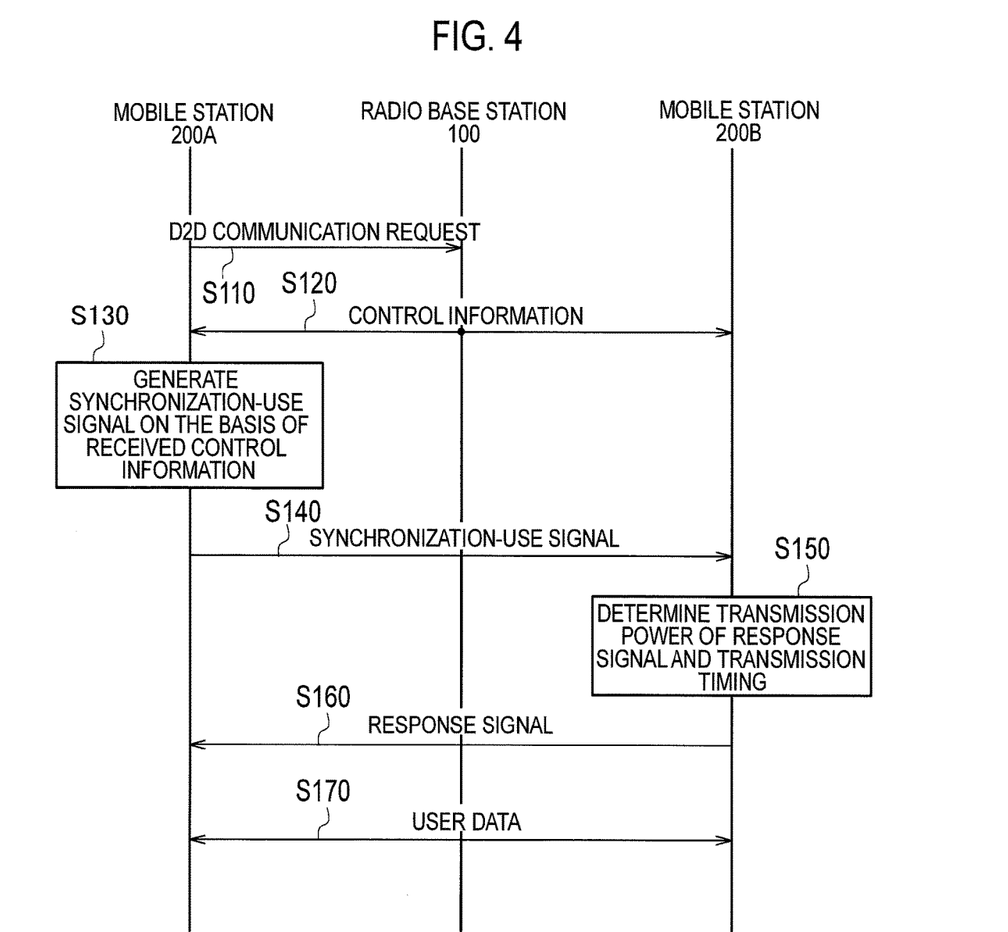
FIG. 4 is a diagram illustrating a first sequence operation example of establishing initial access between the mobile station 200A and the mobile station 200B according to a first embodiment of the present invention.

FIG. 4 illustrates an operation example of an establishment sequence of initial access from the mobile station 200A to the mobile station 200B. In the present operation example, at the initiative of the mobile station 200A, initial access of D2D communication with the mobile station 200B is established.

As illustrated in FIG. 4, the mobile station 200A transmits a D2D communication request (a direct communication request) for requesting the start of the D2D communication with the mobile station 200B to the base station 100 (S110).

The base station 100, that is, the cell C1 transmits control information toward a plurality of mobile stations (including the mobile station 200A and the mobile station 200B) camping on the cell C1 (S120). As described above, the control information includes a signal sequence that is used in the mobile station 200A and the mobile station 200B. Furthermore, the signal sequence includes a radio resource and a transmission power value. Moreover, the control information may be repeatedly transmitted in a predetermined cycle.

In order to establish initial access (an initial connection) with the mobile station 200B, the mobile station 200A, which is a communication request source, generates a synchronization sequence (a synchronization-use signal) on the basis of the received control information and transmits the generated synchronization-use signal toward the mobile station 200B (S130 and S140). The main purpose of transmitting the synchronization-use signal described above includes recognition (for example, confirmation of coincidence of D2D IDs) of the mobile station 200A in the mobile station 200B, measurement (determination regarding whether to start the D2D communication or use to open loop transmission power control) of path loss with the mobile station 200A in the mobile station 200B, establishment (when the mobile station 200A and the mobile station 200B have been connected to the cell C1, it can be regarded that rough synchronization has been already established) of transmission/reception timing synchronization with high accuracy in the mobile station 200B, and the like.

In addition, the mobile station 200A may repeatedly transmit the synchronization-use signal in a predetermined cycle according to a transmission timing of an uplink radio link synchronized with the cell C1. When a plurality of mobile stations camp on the cell C1, the mobile station 200A selects a corresponding signal sequence on the basis of a mobile station serving as a connection destination.

The mobile station 200B receives the synchronization-use signal, which is transmitted from the mobile station 200A, on the basis of the control information received from the cell C1 (S140). Specifically, the mobile station 200B waits for the synchronization-use signal by using a radio resource defined on the basis of the control information received from the cell C1. At this time, the mobile station 200B allows the synchronization sequence reception unit 230 to be switched from a dormant state to a normal state in a predetermined cycle, thereby attempting the reception of the synchronization-use signal by using the radio resource.

Furthermore, the mobile station 200B needs to identify whether the received signal sequence is a signal sequence addressed to the mobile station 200B. When the received signal sequence coincides with a signal sequence applied to the mobile station 200B in advance, the mobile station 200B determines that the received signal sequence is the signal sequence addressed to the mobile station 200B.

The mobile station 200B determines transmission power and a transmission timing of a response signal on the basis of the received synchronization-use signal (S150). The mobile station 200B transmits the response signal, the transmission power and the transmission timing of which are determined, toward the mobile station 200A (S160).

The mobile station 200A transmits data (user data, for example) to be transmitted to the mobile station 200B by using a predetermined radio resource on the basis of the response signal transmitted from the mobile station 200B (S170). In the same manner, the mobile station 200B also transmits data to be transmitted to the mobile station 200A by using a predetermined radio resource on the basis of the received synchronization-use signal.

In this way, between the mobile station 200A and the mobile station 200B, the D2D communication is started. In addition, when failed in the reception of the synchronization-use signal or the response signal, it is possible to repeatedly perform the aforementioned operations from step S110 up to a predetermined number of times.

(3.2) Second Operation Example

Figure 5:
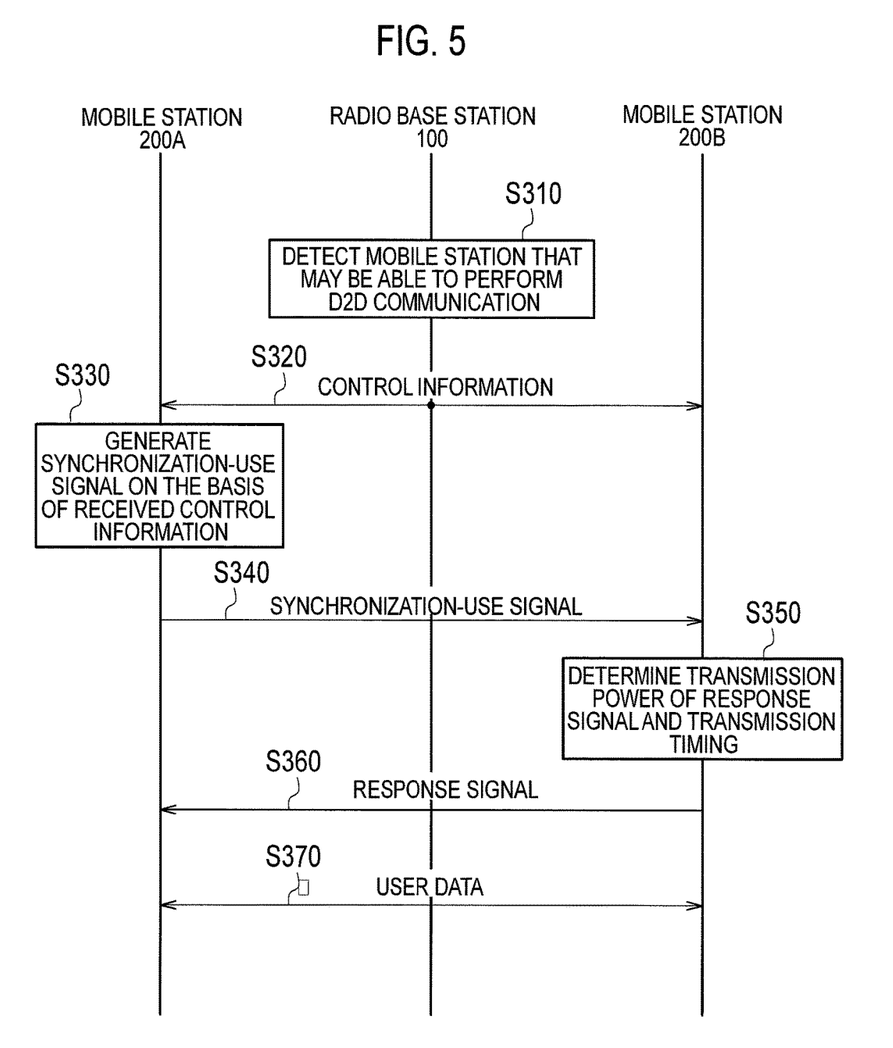
FIG. 5 is a diagram illustrating a second sequence operation example of establishing initial access from the mobile station 200B to the mobile station 200A according to the first embodiment of the present invention.

FIG. 5 illustrates another operation example of the establishment sequence of the initial access from the mobile station 200A to the mobile station 200B. In the present operation example, at the initiative of the radio communication system 10, specifically, at the initiative of the base station 100, the initial access of the D2D communication with the mobile station 200B is established.

Hereinafter, parts different from the aforementioned first operation example will be described. As illustrated in FIG. 5, the base station 100 detects a pair of mobile stations that may be able to perform the D2D communication among the mobile stations connected to the cell C1 (S310).

Specifically, the base station 100 detects a pair (for example, the mobile station 200A and the mobile station 200B) of mobile stations that perform communication via the base station 100 in the cell C1. When the pair of the mobile stations is detectable, the base station 100 transmits control information toward the mobile station 200A and the mobile station 200B camping on the cell C1 (S320).

In addition, since operations in steps S330, S340, S350, S360, and S370 are the same as those in S120, the S130, the S140, the S150, the S160, and the S170 of the aforementioned first operation example, a description thereof will be omitted.

An operation of step S370 is performed, so that the D2D communication is started between the mobile station 200A and the mobile station 200B. In addition, when failed in the reception of the synchronization-use signal or the response signal, it is possible for the mobile station 200A and the mobile station 200B to continue a normal cellular communication, other than the D2D communication, via the base station 100.

(4) Operation and Effect

According to the radio communication system 10, the mobile station 200A transmits the synchronization-use signal, which is to be used for the establishment of the initial access with the mobile station 200B, toward the mobile station 200B on the basis of the control information received from the cell C1. Furthermore, the mobile station 200B directly receives data transmitted from the mobile station 200A, on the basis of the received synchronization-use signal.

Moreover, the mobile station 200B transmits the response signal, which is to be used for the establishment of the initial access with the mobile station 200A, toward the mobile station 200A on the basis of the control information, and the mobile station 200A directly receives data transmitted from the mobile station 200B, on the basis of the received response signal.

Consequently, on the basis of the control information received from the cell C1 (the base station 100), the mobile station 200A and the mobile station 200B are able to easily fix a signal sequence to be transmitted to opposite mobile stations and thus it is possible to easily establish the initial access between mobile stations in the D2D communication.

That is, according to the radio communication system 10, in the future release or Future Radio Access of the LTE, it is possible to efficiently establish the initial access of the D2D communication by an aid of the radio communication system 10 (the base station 100).

In the present embodiment, as described in the first operation example, the mobile station 200A is able to transmit the D2D communication request (the direct communication request) for requesting the start of the D2D communication with the mobile station 200B to the base station 100. Consequently, in response to the request of a user, for example, of the mobile station 200A, it is possible to quickly start the D2D communication with a designated mobile station.

Furthermore, in the present embodiment, as described in the second operation example, the base station 100 detects a pair of mobile stations that may be able to perform the D2D communication among the mobile stations connected to the cell C1. Consequently, the pair of the mobile stations is shifted to the D2D communication, so that it is possible to offload traffic due to cellular communication via the base station 100, and thus the amount of the traffic due to the cellular communication is easily controlled.

In the present embodiment, it is possible to determine the transmission power of the response signal on the basis of the measurement result of the path loss of the synchronization-use signal by the mobile station 200B, so that it is possible to increase the possibility of success in receiving the response signal in the mobile station 200A while suppressing interference to another mobile station, for example. Furthermore, in the present embodiment, it is possible to transmit the response signal, which is scrambled using the identification information of the synchronization-use signal, to the mobile station 200A, so that it is possible to reliably perform scrambling on the response signal while suppressing information necessary for performing the scrambling.

Second Embodiment

Next, a second embodiment of the present invention will be explained. The radio communication system 10 according to the second embodiment has the same configuration (refer to FIG. 1 to FIG. 3) as the radio communication system 10 according to the aforementioned first embodiment. Hereinafter, parts different from the aforementioned first embodiment will be mainly described.

(1) Mobile Station 200A

After the synchronization sequence transmission unit 220 transmits a synchronization sequence (a synchronization signal sequence) toward the mobile station 200B and then a predetermined time (for example, several milliseconds or a plurality of TTIs) lapses, the data channel transmission unit 210 is able to transmit data toward the mobile station 200B. In the present embodiment, the data channel transmission unit 210 constitutes a data transmission unit.

On the basis of the control information received from the cell C1 to which the mobile station 200A is connected, that is, the serving cell, the synchronization sequence transmission unit 220 transmits a synchronization signal sequence, which is a synchronization sequence to be used for the establishment of initial access (an initial connection) with the mobile station 200B, toward the mobile station 200B. In the present embodiment, the synchronization sequence transmission unit 220 constitutes a synchronization signal sequence transmission unit.

On the basis of the control information received from the cell C1, the synchronization sequence reception unit 230 receives a response signal. In the present embodiment, the synchronization sequence reception unit 230 constitutes a response signal reception unit.

Furthermore, the synchronization sequence reception unit 230 determines whether the response signal, which is a synchronization sequence received from the mobile station 200B, is directed to the mobile station 200A. In the present embodiment, the synchronization sequence reception unit 230 constitutes a master determination unit.

The data channel reception unit 240 directly receives data transmitted from the mobile station 200B with employing a reception timing based on the response signal received from the mobile station 200B as a reference. In the present embodiment, the data channel reception unit 240 constitutes a master data reception unit.

(2) Mobile Station 200B

On the basis of the control information received from the cell C1 to which the mobile station 200A and the mobile station 200B are connected, that is, the serving cell, the synchronization sequence transmission unit 220 transmits a response signal, which is a synchronization sequence to be used for the establishment of initial access with the mobile station 200A, toward the mobile station 200A. In the present embodiment, the synchronization sequence transmission unit 220 constitutes a response signal transmission unit.

Furthermore, the synchronization sequence transmission unit 220 transmits a response signal that is a synchronization sequence following a signal sequence (a radio resource and a transmission power value) that is used in the mobile station 200B.

Moreover, the synchronization sequence transmission unit 220 is able to transmit the response signal after the synchronization sequence reception unit 230 receives a synchronization signal sequence and then a predetermined time (for example, several milliseconds or a plurality of TTIs) lapses.

The synchronization sequence reception unit 230 receives the synchronization signal sequence on the basis of the control information received from the cell C1. In the present embodiment, the synchronization sequence reception unit 230 constitutes a synchronization signal sequence reception unit.

Furthermore, the control information received from the cell C1 includes control information (master control information) indicating a signal sequence that is used in the mobile station 200A. The synchronization sequence reception unit 230 waits for the synchronization signal sequence by using a radio resource defined on the basis of the master control information received from the cell C1.

Moreover, the synchronization sequence reception unit 230 determines whether the received synchronization signal sequence is directed to the mobile station 200B. In the present embodiment, the synchronization sequence reception unit 230 constitutes a slave determination unit. When the synchronization signal sequence is received using the radio resource defined on the basis of the master control information, the synchronization sequence reception unit 230 determines that the synchronization signal sequence is directed to the mobile station 200B.

The data channel reception unit 240 directly receives data transmitted from the mobile station 200A with employing a reception timing based on the received synchronization signal sequence as a reference. In the present embodiment, the data channel reception unit 240 constitutes a slave data reception unit.

(3) Operation of Radio Communication System 10

Next, with reference to FIG. 7 and FIG. 8, the operation of the radio communication system 10, specifically, an operation, in which the mobile station 200A and the mobile station 200B establish initial access, will be described.

(3.1) Initial Access (Forward Access) from Mobile Station 200A to Mobile Station 200B

Figure 7:
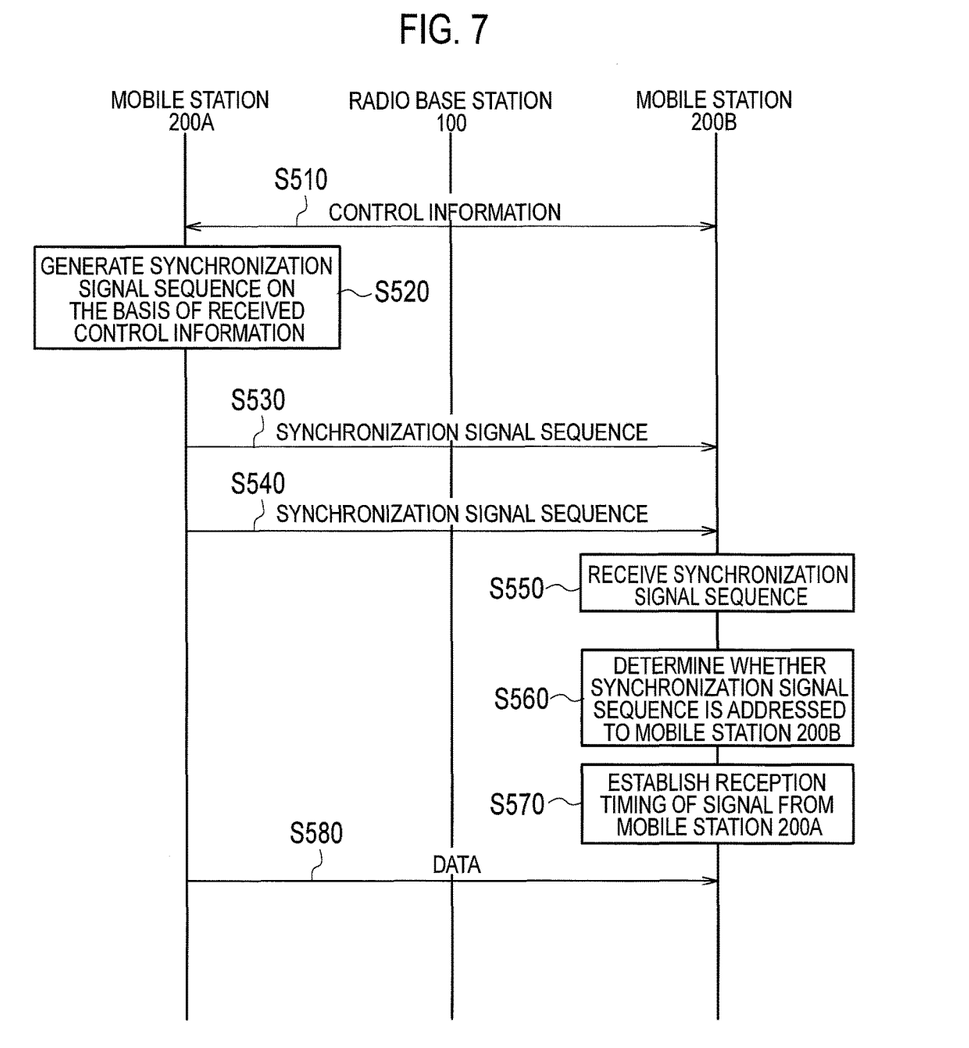
FIG. 7 is a diagram illustrating a sequence operation example of establishing initial access from the mobile station 200A to the mobile station 200B according to a second embodiment of the present invention.

FIG. 7 illustrates an establishment sequence of initial access from the mobile station 200A to the mobile station 200B. In addition, in the present embodiment, the initial access from the mobile station 200A (a connection source) to the mobile station 200B (a connection destination) will be called "forward access".

As illustrated in FIG. 7, the base station 100, that is, the cell C1 transmits control information toward a plurality of mobile stations (including the mobile station 200A and the mobile station 200B) camping on the cell C1 (S510). As described above, the control information includes a signal sequence that is used in the mobile station 200A and the mobile station 200B. Furthermore, the signal sequence includes a radio resource and a transmission power value.

Moreover, the control information may be repeatedly transmitted in a predetermined cycle.

In order to establish initial access (an initial connection) with the mobile station 200B, the mobile station 200A, which is a connection source, generates a synchronization signal sequence on the basis of the received control information and transmits the generated synchronization signal sequence toward the mobile station 200B (S520, S530, and S540). In addition, the mobile station 200A repeatedly transmits the synchronization signal sequence in a predetermined cycle according to a transmission timing of an uplink radio link synchronized with the cell C1. When a plurality of mobile stations camp on the cell C1, the mobile station 200A selects a corresponding signal sequence on the basis of a mobile station serving as a connection destination.

The mobile station 200B performs discontinuous reception of the synchronization signal sequence, which is transmitted from the mobile station 200A, on the basis of the control information received from the cell C1 (S550). Specifically, the mobile station 200B waits for the synchronization signal sequence by using a radio resource defined on the basis of the control information received from the cell C1. At this time, the mobile station 200B allows the synchronization sequence reception unit 230 to be switched from a dormant state to a normal state in a predetermined cycle, thereby attempting the reception of the synchronization signal sequence by using the radio resource.

Furthermore, the mobile station 200B needs to identify whether the received signal sequence is a signal sequence addressed to the mobile station 200B. When the received signal sequence coincides with a signal sequence applied to the mobile station 200B in advance, the mobile station 200B determines that the received signal sequence is the signal sequence addressed to the mobile station 200B (S560).

The mobile station 200B directly receives data transmitted from the mobile station 200A in the following steps with employing a reception timing based on the received synchronization signal sequence as a reference (S570 and S580). In addition, after the synchronization signal sequence is transmitted toward the mobile station 200B and then a predetermined time (for example, several milliseconds or a plurality of TTIs) lapses, the mobile station 200A may transmit data toward the mobile station 200B.

(3.2) Access (Feedback Access) from Mobile Station 200B to Mobile Station 200A

Figure 8:
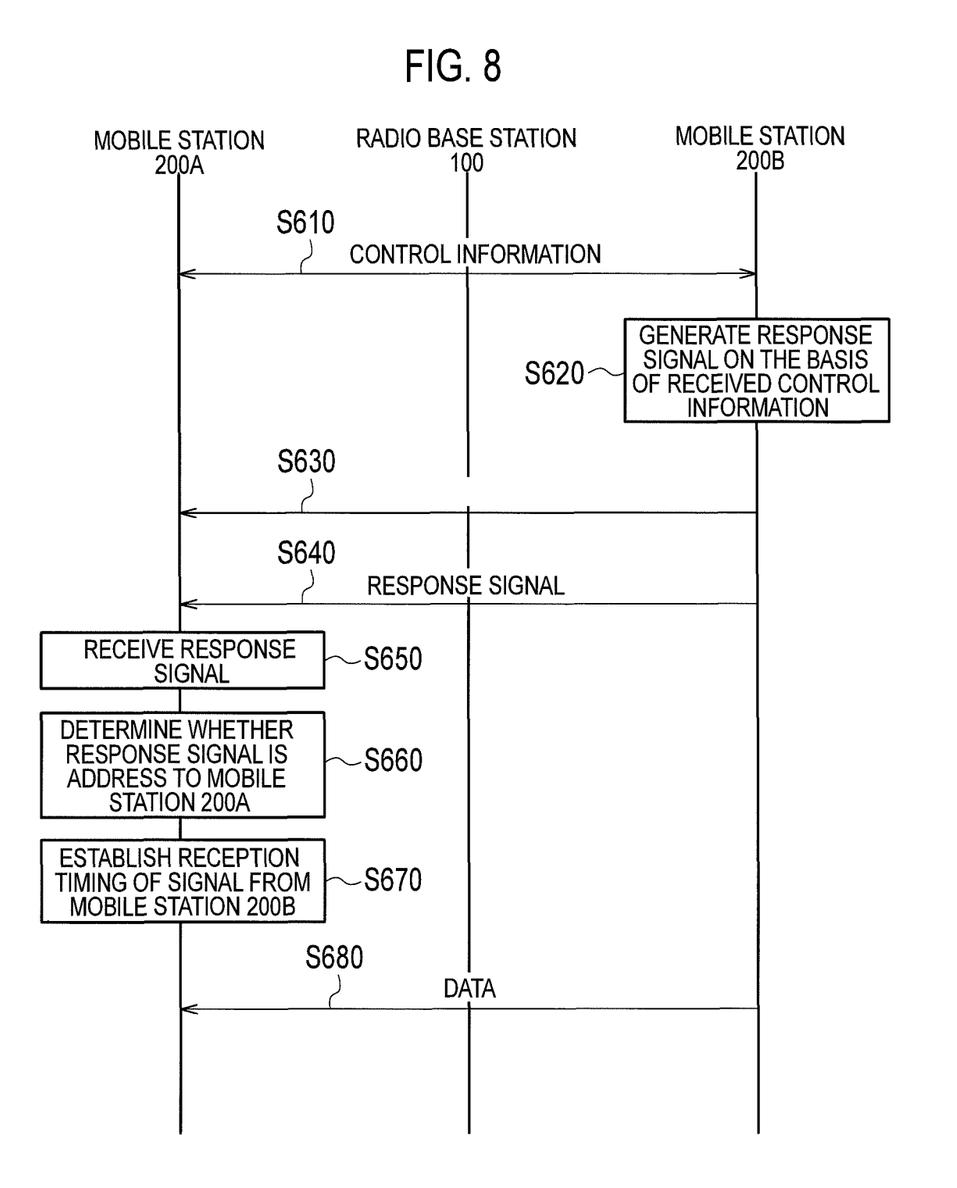
FIG. 8 is a diagram illustrating a sequence operation example of establishing initial access from the mobile station 200B to the mobile station 200A according to the second embodiment of the present invention.

FIG. 8 illustrates an establishment sequence of initial access from the mobile station 200B to the mobile station 200A. In addition, in the present embodiment, the initial access from the mobile station 200B (a connection destination) to the mobile station 200A (a connection source) will be called "feedback access". The feedback access is performed with using the aforementioned forward access as a trigger. In addition, a description for the same content as that of the aforementioned forward access will be appropriately omitted, below.

As illustrated in FIG. 8, the base station 100, that is, the cell C1 transmits control information toward a plurality of mobile stations (including the mobile station 200A and the mobile station 200B) camping on the cell C1 (S610). In addition, this step is the same as the aforementioned step S510.

In order to establish initial access with the mobile station 200A, the mobile station 200B, which is a connection destination, generates a response signal on the basis of the received control information and transmits the generated response signal toward the mobile station 200A (S620, S630, and S640).

The mobile station 200B generates a response signal in accordance with a signal sequence applied to the mobile station 200B in advance, that is, a signal sequence that is used in the mobile station 200B. In addition, when formats of the synchronization signal sequence and the response signal are equal to each other, the mobile station 200B may generate a response signal in accordance with the same signal sequence as the synchronization signal sequence received from the mobile station 200A. That is, the formats of the synchronization signal sequence and the response signal may be equal to each other.

Furthermore, the mobile station 200B may repeatedly transmit the response signal in a predetermined cycle according to the transmission timing of an uplink radio link synchronized with the cell C1, or may repeatedly transmit the response signal according to a transmission timing that is determined with employing the reception timing of the synchronization signal sequence as a reference.

Moreover, the mobile station 200B may transmit the response signal after the synchronization signal sequence is received and then a predetermined time (for example, several milliseconds or a plurality of TTIs) lapses. Furthermore, the transmission power of the response signal may be appropriately controlled in response to the received power of the synchronization signal sequence.

The mobile station 200A performs discontinuous reception of the response signal, which is transmitted from the mobile station 200B, on the basis of the control information received from the cell C1 (S650).

Furthermore, the mobile station 200A needs to identify whether the received signal sequence is a signal sequence addressed to the mobile station 200A. When the received signal sequence coincides with a signal sequence applied to the mobile station 200A in advance, the mobile station 200A determines that the received signal sequence is the signal sequence addressed to the mobile station 200A (S660).

Then, the mobile station 200A directly receives data transmitted from the mobile station 200B in the following steps with employing a reception timing based on the received response signal as a reference (S670 and S680).

In addition, the invention according to the aforementioned present embodiments may be expressed as follows.

A radio communication method, which uses a master mobile station that transmits and receives a radio signal and a slave mobile station that transmits and receives a radio signal to and from the master mobile station without passing through a base station. The method includes a step of transmitting, by the master mobile station, a synchronization signal sequence to be used for the establishment of initial access with the slave mobile station toward the slave mobile station on the basis of control information received from a cell to which the master mobile station is connected, a step of receiving, by the slave mobile station, the synchronization signal sequence on the basis of the control information received from the cell, a step of determining, by the slave mobile station, whether the received synchronization signal sequence coincides with a sequence or an index notified by the control information, and a step of directly receiving, by the slave mobile station, data transmitted from the master mobile station with employing a reception timing based on the received synchronization signal sequence as a reference. In addition, the step of directly receiving is not essential.

The method further includes a step of transmitting, by the slave mobile station, on the basis of the control information, a response signal to be used for the establishment of initial access with the master mobile station toward the master mobile station, a step of receiving, by the master mobile station, the response signal on the basis of the control information, a step of determining, by the master mobile station, whether the received response signal is directed to the master mobile station, and a step of directly receiving, by the master mobile station, data transmitted from the slave mobile station with employing a reception timing based on the received response signal as a reference. In addition, the step of directly receiving is not essential.

A radio communication system in accordance with embodiments disclosed herein includes a master mobile station that transmits and receives a radio signal and a slave mobile station that transmits and receives a radio signal to and from the master mobile station without passing through a base station. The master mobile station includes a synchronization signal sequence transmission unit that transmits a synchronization signal sequence to be used for the establishment of initial access with the slave mobile station toward the slave mobile station on the basis of control information received from a cell to which the master mobile station is connected. The slave mobile station includes a synchronization signal sequence reception unit that receives the synchronization signal sequence on the basis of the control information received from the cell, a slave determination unit that determines whether the received synchronization signal sequence coincides with a sequence or an index notified by the control information, and a slave data reception unit that directly receives data transmitted from the master mobile station with employing a reception timing based on the received synchronization signal sequence as a reference. In addition, the slave data reception unit is not essential.

The slave mobile station includes a response signal transmission unit that transmits a response signal to be used for the establishment of initial access with the master mobile station toward the master mobile station on the basis of the control information, and the master mobile station includes a response signal reception unit that receives the response signal on the basis of the control information, a master determination unit that determines whether the received response signal is directed to the master mobile station, and a master data reception unit that directly receives data transmitted from the slave mobile station with employing a reception timing based on the received response signal as a reference. In addition, the master data reception unit is not essential.

The control information includes slave control information indicating a signal sequence to be used in the slave mobile station serving as a connection destination of the master mobile station, and the synchronization signal sequence transmission unit transmits the synchronization signal sequence in accordance with the signal sequence to be used in the slave mobile station toward the slave mobile station on the basis of the slave control information.

The control information includes master control information indicating a signal sequence to be used in the master mobile station, the synchronization signal sequence reception unit waits for the synchronization signal sequence by using a radio resource defined on the basis of the master control information, and the slave determination unit determines that the synchronization signal sequence is directed to the slave mobile station when the synchronization signal sequence reception unit receives the synchronization signal sequence by using the radio resource.

The response signal transmission unit transmits the response signal after the synchronization signal sequence reception unit receives the synchronization signal sequence and then a predetermined time lapses.

The master mobile station includes a data transmission unit that transmits the data toward the slave mobile station after the synchronization signal sequence transmission unit transmits the synchronization signal sequence and then a predetermined time lapses.

The response signal transmission unit transmits the response signal in accordance with a signal sequence to be used in the slave mobile station.

A master mobile station, which transmits and receives a radio signal to and from a slave mobile station without passing through a base station, includes a synchronization signal sequence transmission unit that transmits a synchronization signal sequence to be used for the establishment of initial access with the slave mobile station toward the slave mobile station on the basis of control information received from a cell to which the master mobile station is connected, a response signal reception unit that receives a response signal from the slave mobile station on the basis of the control information, a master determination unit that determines whether the received response signal coincides with a sequence or an index notified by the control information, and a master data reception unit that directly receives data transmitted from the slave mobile station with employing a reception timing based on the received response signal as a reference. In addition, the master data reception unit is not essential.

A slave mobile station, which transmits and receives a radio signal to and from a master mobile station without passing through a base station, includes a synchronization signal sequence reception unit that receives a synchronization signal sequence on the basis of control information received from a cell to which the master mobile station is connected, a slave determination unit that determines whether the received synchronization signal sequence is directed to the slave mobile station, a slave data reception unit that directly receives data transmitted from the master mobile station with employing a reception timing based on the received synchronization signal sequence as a reference, and a response signal transmission unit that transmits a response signal to be used for the establishment of initial access with the master mobile station toward the master mobile station on the basis of the control information. In addition, the slave data reception unit is not essential.

Other Embodiments

As described above, the content of the present invention is disclosed through one embodiment according to the present invention. However, it should not be interpreted that the statements and drawings constituting a part of the present disclosure limit the present invention. From this disclosure, a variety of alternate embodiments will be apparent to one skilled in the art.

For example, in the aforementioned embodiments of the present invention, the path loss of the synchronization-use signal is measured in the mobile station 200B. However, for the measurement of path loss with the mobile station 200B in the mobile station 200A or timing synchronization, the synchronization-use signal may be transmitted from the mobile station 200B.

As described above, needless to say, the present invention includes various embodiments and the like not described here. Therefore, the technical range of the present invention is to be defined only by the inventive specific matter according to the adequate claims from the above description.

In addition, the entire content of Japanese Patent Application No. 2011-141925 (filed on Jun. 27, 2011) and Japanese Patent Application No. 2011-249899 (filed on Nov. 15, 2011) is incorporated in the present specification by reference.

INDUSTRIAL APPLICABILITY

According to the characteristics of the present invention, it is possible to easily establish initial access between mobile stations in the D2D communication.

REFERENCE SIGNS LIST

10 . . . Radio communication system
100 . . . Base station
110 . . . Control channel transmission unit
120 . . . Data channel transmission unit
130 . . . Control channel reception unit
140 . . . Data channel reception unit
200A, 200B . . . Mobile station
210 . . . Data channel transmission unit
220 . . . Synchronization sequence transmission unit
230 . . . Synchronization sequence reception unit
240 . . . Data channel reception unit

The invention claimed is:

1. A radio communication method, which uses a first mobile station that transmits and receives a radio signal and a second mobile station that performs direct communication for transmitting and receiving a radio signal to and from the first mobile station without passing through a base station, comprising:
   a step of generating and transmitting, by the first mobile station, a synchronization-use signal to be used for establishment of initial access with the second mobile station toward the second mobile station on the basis of identification information received from the base station to which the first mobile station is connected;
   a step of receiving, by the second mobile station, the synchronization-use signal; and
   a step of generating and transmitting, by the second mobile station, a response signal when identification information received from the base station coincides with identification information obtained from the synchronization-use signal received from the first mobile station,
   wherein the identification information received from the base station includes information identifying the synchronization-use signal.

2. The radio communication method according to claim 1, comprising:
   a step of determining, by the second mobile station, transmission power and a transmission timing of a response signal on the basis of the received synchronization use signal, and transmitting the response signal toward the first mobile station; and
   a step of starting, by the first mobile station and the second mobile station, communication on the basis of the synchronization use signal and the response signal.

3. A radio communication system, comprising:
   a first mobile station that transmits and receives a radio signal and
   a second mobile station that performs direct communication for transmitting and receiving a radio signal to and from the first mobile station without passing through a base station,
   wherein the first mobile station comprises:
   a first receiver that receives identification information from the base station to which the first mobile station is connected;
   a first transmitter that transmits a synchronization-use signal to be used for establishment of initial access with the second mobile station toward the second mobile station on the basis of the identification information received by the first receiver, and
   the second mobile station comprises:
   a second receiver that receives the identification information from the base station;
   the second receiver receives the synchronization-use signal; and
   a second transmitter that transmits a response signal when the identification information received from the base station coincides with identification information obtained from the synchronization-use signal received from the first mobile station,
   wherein the identification information received from the base station includes information identifying the synchronization-use signal.

4. The radio communication system according to claim 3, wherein the first transmitter transmits a direct communication request for requesting direct communication with the second mobile station, which is connected to the base station, toward the base station, and
   wherein on the basis of the direct communication request, the first receiver and the second receiver receive the identification information transmitted from the base station.

5. The radio communication system according to claim 4, wherein
   the base station detects a pair of mobile stations that may be able to perform the direct communication among mobile stations connected to a cell, and transmits the identification information toward the detected pair of mobile stations.

6. The radio communication system according to claim 3, wherein
   the first receiver receives control information from the base station to which the first mobile station is connected, and
   the control information includes a transmission power value that is used for transmission of the synchronization use signal.

7. The radio communication system according to claim 3, wherein the synchronization use signal is the synchronization use signal addressed to the second mobile station when the synchronization use signal coincides with a signal applied to the second mobile station in advance.

8. The radio communication system according to claim 3, wherein the first transmitter transmits the synchronization use signal multiple times.

9. The radio communication system according to claim 3, wherein
   the first transmitter and first receiver transmits and receives data to and from the second mobile station, and
   the second transmitter and second receiver transmits and receives data to and from the first mobile station,
   wherein the second mobile station comprises a processor that determines transmission power and a transmission timing of the response signal on the basis of the synchronization-use signal received by the second receiver, and the second transmitter transmits the response signal toward the first mobile station.

10. The radio communication system according to claim 9, wherein
the processor measures path loss of the synchronization-use signal, wherein the processor and second transmitter determine whether to transmit the response signal to the first mobile station on the basis of a measurement result of the path loss by the processor.

11. The radio communication system according to claim 10, wherein the processor determines transmission power of the response signal on the basis of the measurement result of the path loss by the processor.

12. The radio communication system according to claim 9, wherein the second transmitter transmits the response signal to the first mobile station, the response signal being scrambled using the identification information of the synchronization-use signal.

13. The radio communication system according to claim 3, wherein
The second receiver performs discontinuous reception of the synchronization-use signal.

14. A mobile station, which performs direct communication for transmitting and receiving a radio signal to and from another mobile station without passing through a base station, comprising:

a receiver that receives identification information from a base station;
the receiver receives a synchronization-use signal to be used for establishment of initial access with the other mobile station; and
a transmitter that transmits a response signal when the identification information received from the base station coincides with identification information obtained from the synchronization-use signal received from the other mobile station,
wherein the identification information received from the base station includes information identifying the synchronization-use signal.

15. The mobile station according to claim 14,
wherein the transmitter and receiver transmits and receives data to and from the other mobile station,
wherein a processor determines transmission power and a transmission timing of the response signal on the basis of the synchronization-use signal received by the receiver, and the transmitter transmits the response signal toward the other mobile station.

* * * * *